United States Patent [19]
Mickler et al.

[11] 3,832,924
[45] Sept. 3, 1974

[54] SHUFFLE FEEDING METHOD AND APPARATUS

[76] Inventors: Edwin Walter Mickler, P.O. Box 43, Zellwood, Fla. 32798; Dan Bedgood, 25 E. Shirley Shores Dr., Tavares, Fla. 32778

[22] Filed: Apr. 16, 1973

[21] Appl. No.: 351,796

[52] U.S. Cl.................... 83/167, 83/425.3, 83/431, 198/218
[51] Int. Cl............................................. B26d 7/00
[58] Field of Search...... 198/218, 211, 212; 209/98; 83/425.3, 431, 167

[56] References Cited
UNITED STATES PATENTS

| | | | |
|---|---|---|---|
| 1,046,511 | 12/1912 | Velten | 198/218 |
| 1,513,465 | 10/1924 | Lide | 198/218 X |
| 2,144,281 | 1/1939 | Wuest | 198/218 X |
| 2,489,404 | 11/1949 | Davis | 198/218 |

*Primary Examiner*—Allen N. Knowles
*Attorney, Agent, or Firm*—Duckworth, Hobby & Allen

[57] ABSTRACT

A vegetable conveyor system for conveying vegetables into a rotary cutter in which a set of partially rotating plates is interspaced with a second set of partially rotating plates, each set of rotating plates being rotatable in timed sequence with the other, first in one direction and then back to its originating point, so that the partial rotation of one set of plates will shift vegetables to the second set and the second set will then shift the vegetables to the next plate of the first set, and so forth, until they are fed to the cutter. The plates are rotated back and forth by a pair of reciprocating connecting bars driven by the same cam. The conveyor maintains the vegetables in a transverse horizontal position for cutting into uniform pieces by spaced rotary cutters.

7 Claims, 8 Drawing Figures

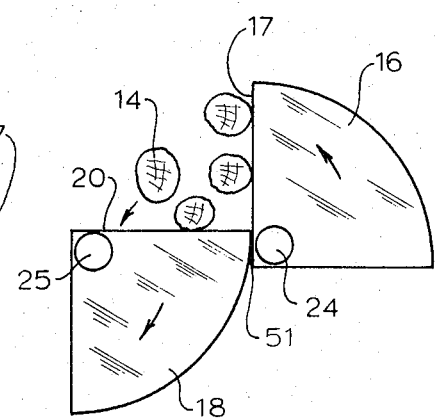
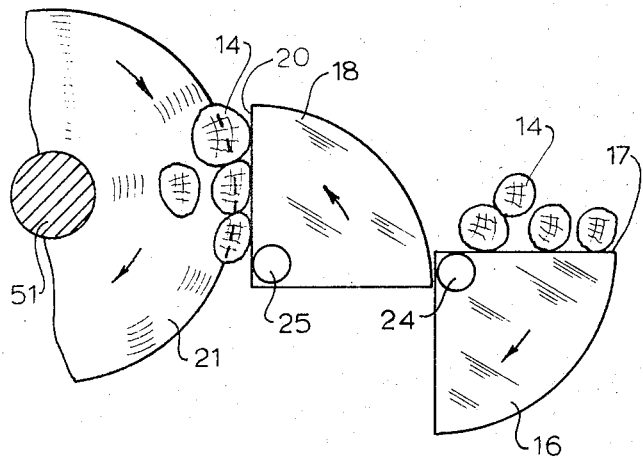
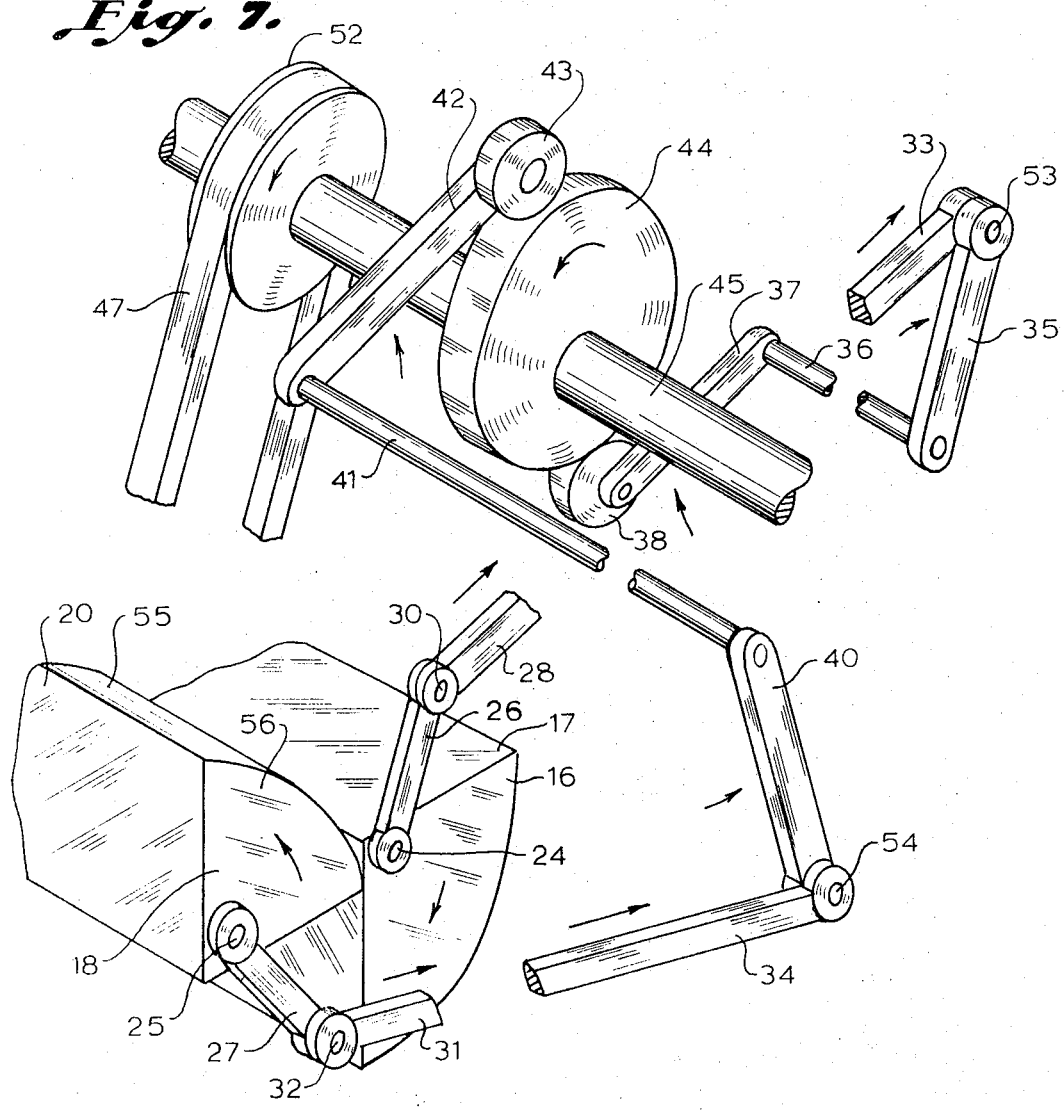

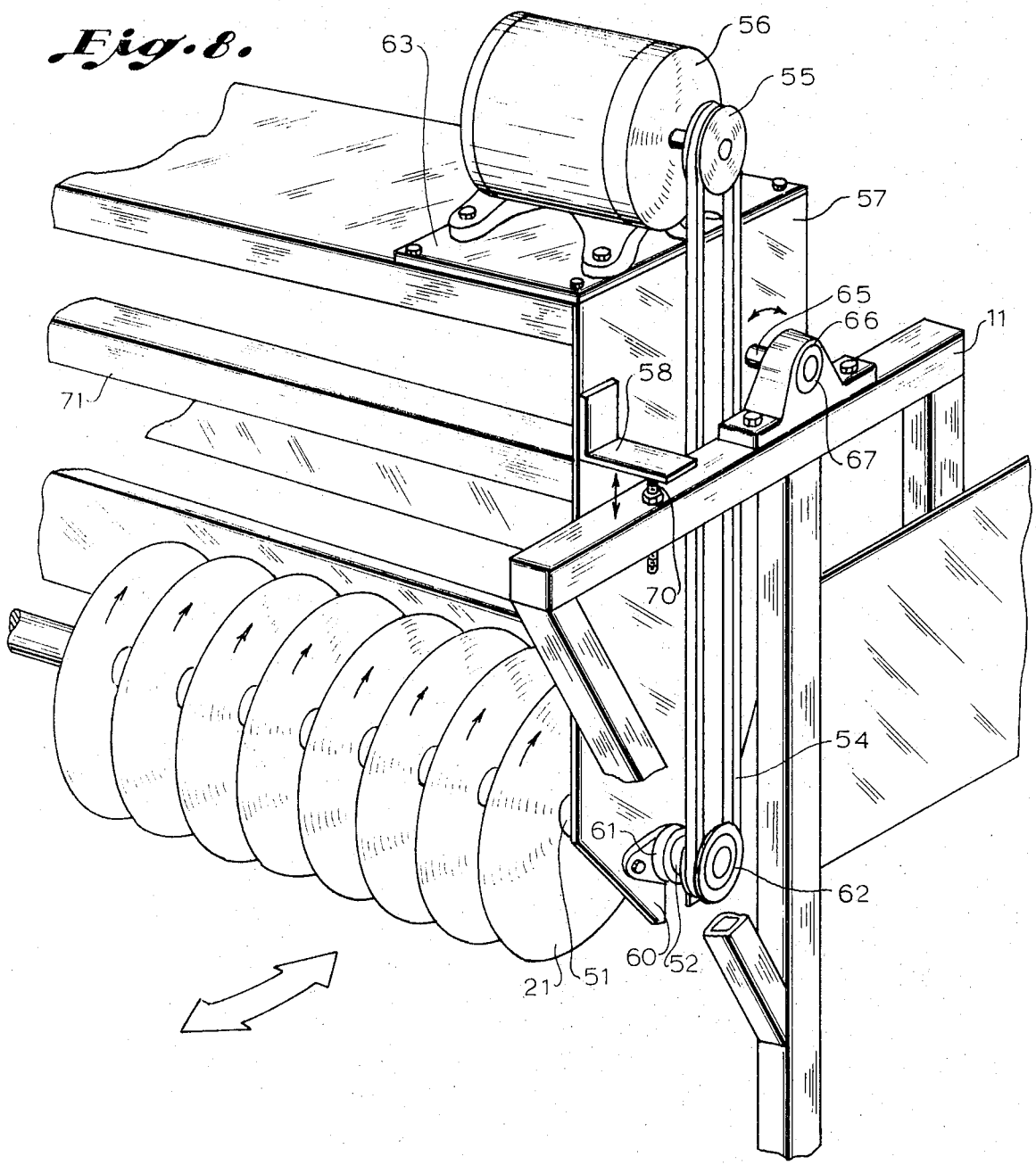

SHUFFLE FEEDING METHOD AND APPARATUS

BACKGROUND OF THE INVENTION

The present invention relates to an apparatus and method for cutting vegetables into two or more pieces and for trimming the ends of vegetable articles, such as celery, carrots, and the like. It is concerned particularly with a batch flipping conveyor mechanism for conveying the vegetables in a transverse horizontal position to rotary cutters.

In the past a great variety of vegetable conveyors for feeding cutters have been provided, but the most common type is the endless flexible conveyor belt feeding a great variety of cutters depending upon the particular job being performed. One of the problems of past conveyors is aligning the vegetables in the correct position for being cut or trimmed and in the case of vegetables, such as celery or carrots, it is desirable to have the vegetables aligned in a transverse horizontal position upon reaching the cutters so that they can have heads or other material trimmed and so that they can be cut automatically in a uniform manner.

In the packing of celery it has been common practice to break off the outer stalks in the packaging operation, as well as to trim certain material from the stalks for disposal. The present invention helps utilize the removed outer stalks of celery and allows such stalks when they are trimmed to be dropped into an endless belt conveyor where they are fed onto a shuffling conveyor in accordance with the present invention which aligns the celery in a transverse horizontal manner in groups as it is fed into a rotary cutter spaced at predetermined intervals to chop the celery stalks into a uniform size; the cutting also trims the ends of the vegetables. The chopped celery can then be fed to a blower separator for separating some of the trimmed tops while allowing the heavier chopped celery to be further processed where it can be chopped and cleaned into finer pieces, in which condition it is sold for use in the commercial preparation of soups, and the like, and may also be packaged and frozen for sale to the consumer.

In the past there have been shuffle feeding mechanisms for feeding vegetables, such as illustrated in U.S. Pat. No. 3,269,535 for a Shuffle Feed Sorting Structure; U.S. Pat. NO. 3,291,173 for Shuffle Feed End Trimmer for Vegetables; U.S. Pat. 3,273,711 for Shuffle Feed Sorter with Sliver Ejection; and U.S. Pat. No. 2,792,929 for Shuffle Feed Structure. Each of these prior art shuffle feeding mechanisms operate to slide or reciprocate angles bars to shift pickles, or the like, from one tier to the next.

The present invention is directed towards a simplified and reliable feeding mechanism which is especially adapted for use with celery, but may also be utilized with carrots and a great variety of other vegetables.

SUMMARY OF THE INVENTION

The present invention relates to a method and apparatus for feeding and cutting vegetables and includes a method of feeding vegetables onto a batch flipping conveyor in accordance with the apparatus. The batch conveyor has a frame along with circular or rotary cutters at one end of the shuffle feeding mechanism. The feeding mechanism is connected to the frame to feed the vegetables in batches in a transverse manner to the cutter and has a set of first rotary plates and a set of second plates interspaced between each other, with each set of plates operating in unison. The vegetables on one set of plates are rotated to shift the vegetables to the next set of plates and then the rotating plates are rotated in an opposite direction to their beginning position, while the second set of rotary plates rotates to shift the vegetables back to the first set of rotary plates, thereby shifting the vegetables from one set of interspaced plates to the next as they are moved along the conveyor. The rotary plates are driven through a motor driven cam drive which acts upon a pair of followers, one for each of a first and second connecting linkage having reciprocating bars which alternately reciprocate to shift one set of rotary plates in one direction and then in the reverse direction, and then the second set in one direction and then in its reverse direction.

The method in accordance with the present invention includes feeding the vegetables onto the shuffle conveyor, rotating the firt set of rotatable plates to shift the vegetables from that set of plates to the second set of rotary plates which are interspaced with the first set then rotating the first set of rotatable plates in its opposite direction to return to its starting point, then rotating the second set of partially rotatable plates to shift the vegetables from the second set of plates back to the first set of plates and returning the second set of rotatable plates back to their starting position so that the alternate rotation of the first and second sets of plates will convey the vegetables in a transverse position towards the cutters.

BRIEF DESCRIPTION OF THE DRAWINGS

Other objects, features and advantages of this invention will be apparent from a study of the written description and the drawings in which:

FIG. 5 is a side sectional view of the shuffling plates in operation with vegetables being shuffled thereon;

FIG. 6 is a side sectional view of the shuffling mechanism feeding the cutters;

FIG. 7 is a perspective view of the cam drive mechanism and connection linkage for driving the shuffling plates; and FIG. 8 is a perspective view of the cutter drive mechanism.

DESCRIPTION OF THE PREFERRED EMBODIMENT

Figure 1:
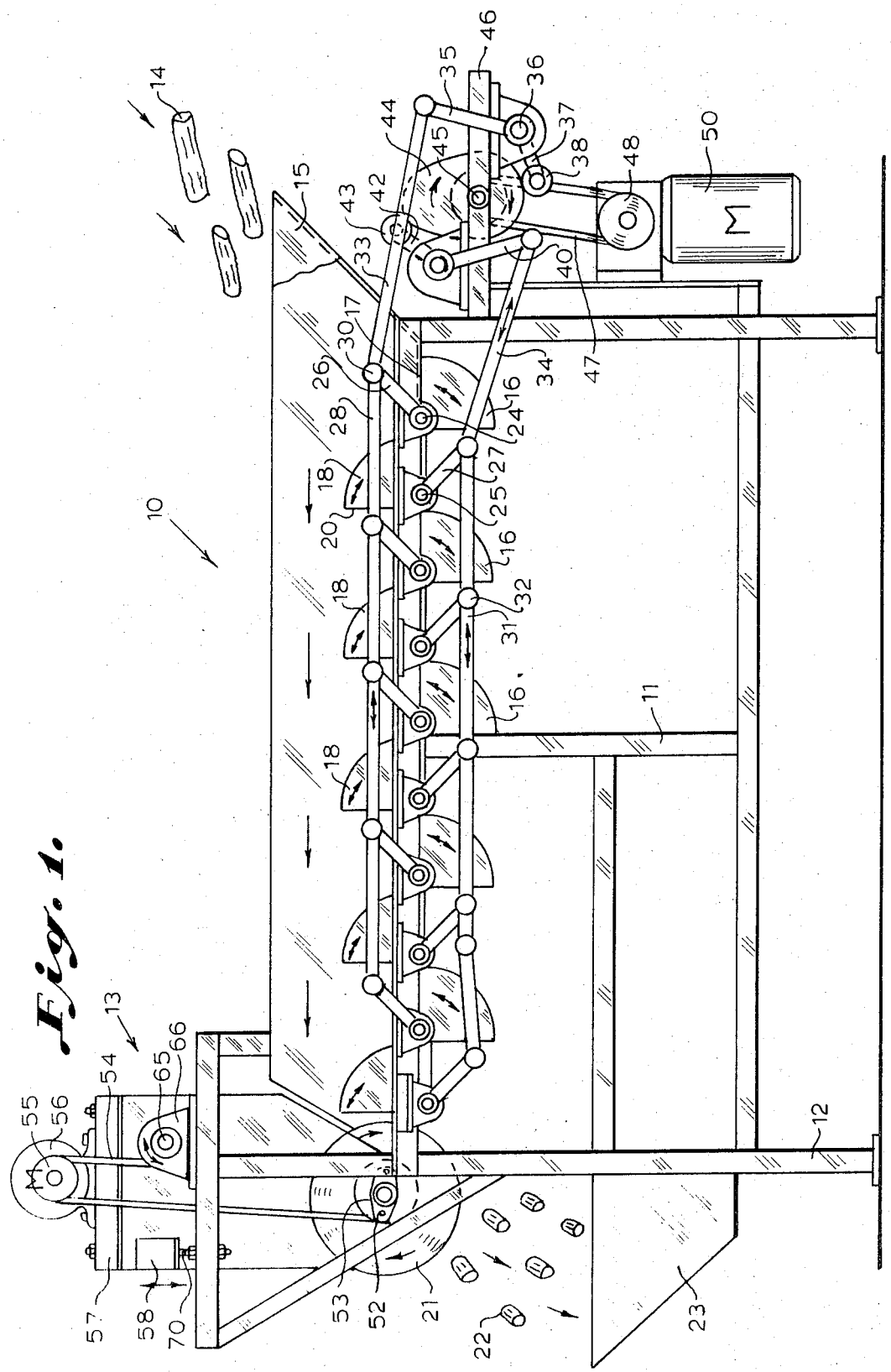
FIG. 1 is a sectional side view of the shuffle feeding and cutting mechanism with arrows to indicate the method of operation.
Figure 2:
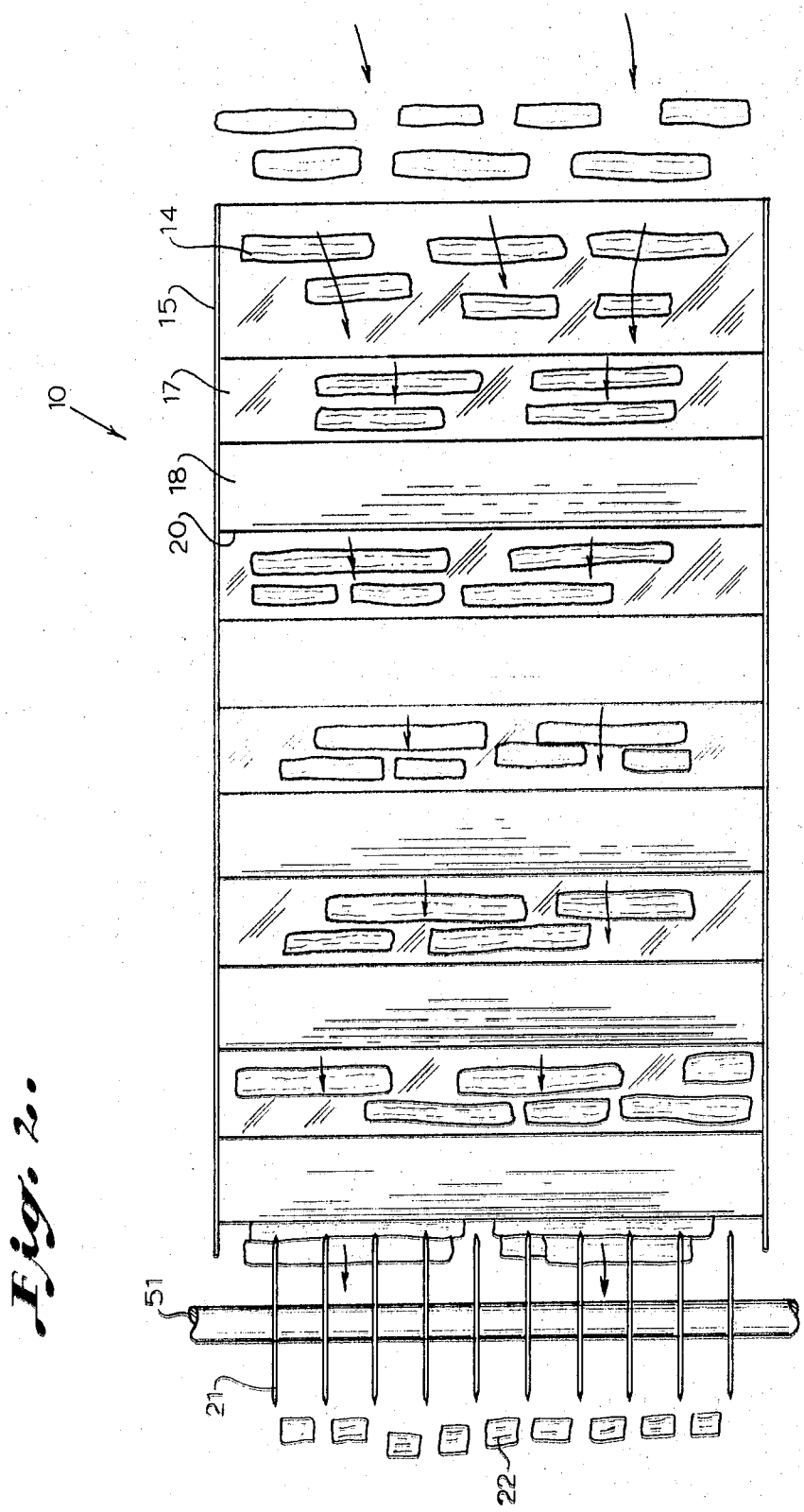
FIG. 2 is a top sectional view of the apparatus in accordance with FIG. 1.
Figure 3:
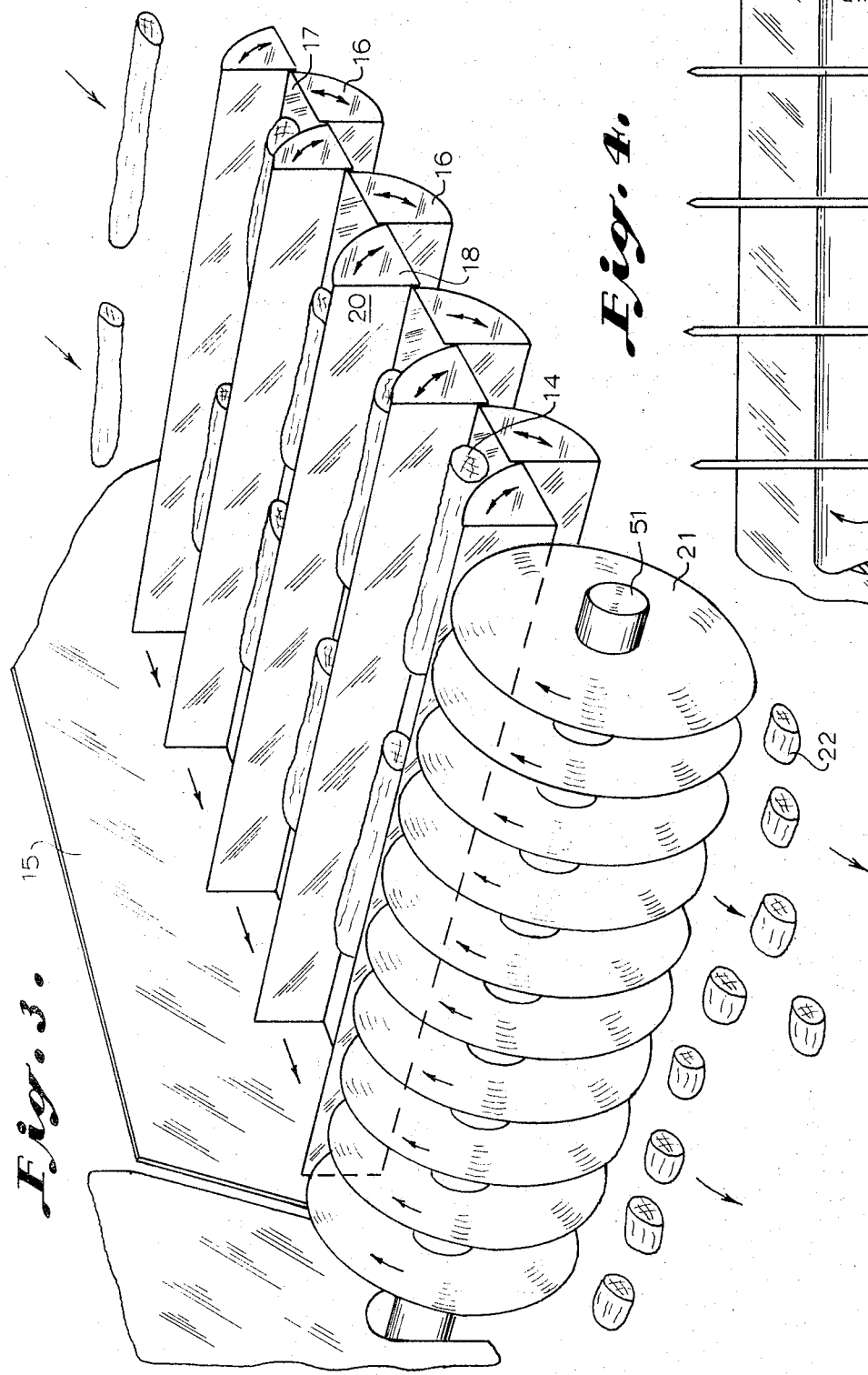
FIG. 3 is a perspective view of the apparatus with portions cut away showing material being fed and cut.
Figure 4:
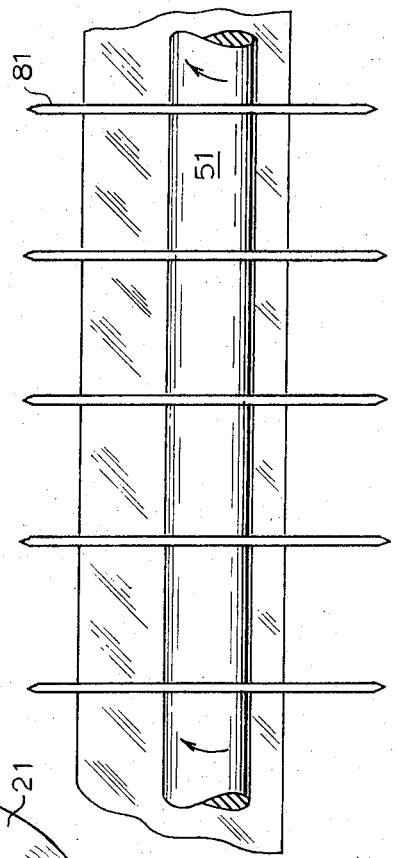
FIG. 4 is an end perspective view of the cutting blades.

Referring now to the drawings, and especially to FIGS. 1, 2, 3 and 4, a batch flipping conveyor mechanism 10 is connected to a framework 11 having legs 12 and a cutting mechanism 13. Vegetables such as celery 14 are fed by hand or from another conveyor to the conveyor mechanism 10, which has retaining walls 15. The vegetables fall onto a first set of partially rotatable members or plates 16 which have their faces 17 in a horizontal receiving position, while a second set of rotatable plates 18 have their faces 20 rotated to a second position, with the plates 20 in a generally upright position for dumping vegetables 14 which might be thereon onto the surfaces 17 of the rotatable members 16, so that the members 16 and 18 are interspaced between each other and each set is rotated in unison alternately with the other set of plates so that when the plates 18 are in their upright position, as illustrated, plates 16 are in their starting or flat positions (FIG. 1) so that the vegetables are alternately shifted from the surfaces 17 of plates 17 to the surface 20 of plates 18 and from the surfaces of 20 of plate 18 back to the surfaces 17 of plate 16 until they reach the cutters 21. The vegetables 14 are cut into a uniform length as illustrated at 22 where they are caught by chute 23 and may be fed from chute 22 onto a conveyor to the next step in the processing of the vegetables. The shuffling members 16 and 18 are illustrated as quarter circular sections but it should of course be realized that these can be of other shapes as desired without departing from the spirit and scope of the invention. Shuffling members 16 and 18 are attached to the frame portion 11 by shafts or pins 24 which are fixedly attached to the plates 16 and 18 so that shifting of the shafts 24 will shift the plates. Each shaft 24 and 25 has an arm link 26 and 27, respectively, fixedly attached thereto so that when rotated the plates 16 and 18 will be rotated. The arms 26 are connected to a reciprocating bar 28 by connecting pins 30 which pins allow the end of the bars 26 to freely rotate relative to the reciprocating bars 28 so that reciprocation of the bar 28 will pull the arms 26 to rotate the shaft 24 to shift the shuffling plates 16 from the position shown into the upright position. The reciprocation of a reciprocating bar 31 will rotate the arms 27 which are connected by pins at 22 to rotate the shafts 25 to shift the shuffling plates 18 from their upright position, as illustrated, back to their original horizontal position similar to shuffling plates 16. Reciprocating bar 28 is connected to a second reciprocating drive bar 33 while the reciprocating bar 31 is connected to a second drive bar 34. The reciprocating bar 33 is connected to another arm 35 which is pinned to a shaft 36 which is in turn connected to a cam follower arm 37 having a rotatable cam follower 38 thereon. Similarly, the bar 34 is connected to a link 40 which is connected to a shaft 41 and a follower arm 42 which has a cam roller follower 43 on the end thereof. The rollers 38 and 43 each engage a rotatable cam 44 which rotates on a shaft 45 connected to a frame member 46. The cam 45 is driven by a belt 47 driven by pulley 48 which is actuated by an electrical motor 50. Rotation of the cam 44 drives the cam followers 38 and 43 in a timed sequence in accordance with their positions which are determined by the location of the connection to the shafts 36 and 41 and the length of the arms 37 and 42. The cam is shaped to drive the reciprocating bar 28 back and forth for shifting the shuffling plates 18 from their horizontal position to their upright position and then back to their horizontal position while the reciprocating bar 31 is driven by the cam 45 to reciprocate to and fro to drive the shuffling plates 16 from their horizontal position, as shown, to their upright position and then back to horizontal position, alternately with the shuffling plates 18. Thus all of the plates 18 are driven in unison and all of the plates 16 are driven in unison and are actuated alternately to shift the vegetables in batches to the cutters 21. The plurality of cutters 21 may be spaced as desired, such as three or four inches apart, and will cut the vegetables to a uniform width. The cutters 21 are each connected to a shaft 51 which is held in a bushing or bearing 52 to the frame 11 and is driven through a pulley 53 by a belt 54 from a pulley 55 which is driven by a motor 56. The motor is mounted to a motor frame 57 which is supported separately from the frame 11 by a rotatable shaft 65 mounted in a support 66 and by a bracket 58 riding on an adjustable support 70 as will be discussed in more detail in connection with FIG. 8.

Turning now to FIGS. 5 and 6, the operation of the method is more clearly illustrated with the shuffling plate 16, which is sealed on all sides and at each end with the plates 17 shifting the vegetables 14 to the surface 20 of the shuffling plates 18. Shuffling plate 16 is held by the shaft 24 while shuffling plate 18 is held by the shaft 25 and each are aligned to maintain a tight fit 51 between the plates so as to prevent vegetables or portions thereof from slipping into the crevices between the interspaced plates.

FIG. 6 has the last plate 18 shifting the vegetables 14 into the rotary cutters 21 rotated on shafts 51.

Referring to FIG. 7, a perspective view of the drive mechanism more clearly illustrates this operation in which the cam 44 is fixedly attached to a rotatable shaft 45 and driven by drive belt 47 driving the pulley 52 which is also fixedly attached to the rotating shaft 45. The cam 44 drives a pair of cam follower rollers 43 and 38 connected respectively to follower arms 42 and 37 which are in turn fixedly attached to shafts 41 and 36 respectively. Shaft 36 has an arm 37 fixedly attached thereto at a predetermined position while the shaft 41 has an arm 40 fixedly attached thereto in a predetermined angular position. Shaft 35 is movably pinned to a driving length 33 and is pinned with a pin 53 and in turn drives the reciprocating rod 28 which is movably secured with a pin 30 to a driving arm 26 which is rigidly attached by pins 24 to the shuffling plate 16 having its horizontal surface 17. The driving arm 40 is movably pinned by pin 54 to a linkage member 34 which is connected to the reciprocating bar 31. Reciprocating bar 31 is movably pinned by member 32 to the shuttle plate driving arm 27 which is fixedly attached to a shaft 25 and is fixedly connected to rotatable shuffling plates 18 which have operative surfaces 20 in the upright position. Rotatable plates 16 and 18 only rotate through a partial circle of approximately 90°, and then rotate back to their initial position so that their surfaces 17 and 20 are shuffling vegetables from one plate to the next by the partial rotation of the surfaces. Each shuttle plate has a curved surface 55 which prevents vegetables from falling behind each shuffle plate and each shuffle plate has end members 56 which prevent vegetables and parts thereof from getting in between the shuffling members 16 and 18. The curved surface of 18 maintains a close fit with the next plate to prevent anything but very small particles from falling between the shuffle plates.

The operation of the method in accordance with the present invention provides for feeding vegetables onto the shuffling plates 16 or 18 rotating the plate surfaces 17 or 20 to shift the vegetables onto the opposite surface, such as illustrated in FIGS. 5 and 6, with FIG. 5 shifting the vegetables from the surface 17 to the surface 20, and FIG. 6 shifting the vegetables from the surface 20 into the cutter 21. The method then returns the one set of rotaty surfaces 17 to its horizontal position and rotates the surfaces 20 to their upright position to shift the vegetables back onto the set of surfaces 17 and finally feeding the vegetables into the cutters 21.

FIG. 8 illustrates the cutter mechanism having circular rotatable cutter blades 21 connected to a shaft 51 which is held at either end by bushings or bearings 52 to a surface 60 by the bearing mount 61. The shaft 51 is connected to a pulley 62 which is driven by a belt 54, driven by a pulley 55 which in turn is driven by an electric motor 56. Electric motor 52 is mounted to a motor mount plate 63 which is mounted to a frame 57 which is movably supported in Frame 11. Frame portion 57 is held to the main frame by rotatable shaft 65 which is connected to a bearing support member 66 having bearings 67 supporting the shaft 65 and by a bracket 58 fixedly attached to the frame portion 57 and extending over an adjustable threaded supporting member 70 which allows adjustment to the supporting section 57 for adjusting the positioning of blades 21 by rotating the member 70 up and down to the desired position. Frame portion 57 has supporting members 71 for providing more rigid support for the section 57 which has the lower frame portion 60 for connecting the cutter blades mounting bracket 61 to and for holding the shaft 51 and the blades 21 so that the whole assembly shifts in accordance with the threading of the support member 70 driving the bracket 58 and rotating the frame assembly 57 on the shaft 65 relative to frame section 11, thereby annularly shifting blades 21 for adjusting their position relative to the end of the flipping conveyor mechanism.

It should be clear at this point that an apparatus and method have been provided for the conveying of vegetables to a circular cutter and are mounted to feed the vegetables in a proper position for cutting by the cutters. The conveyor motion is by interspaced flippers or plates which are rotated around a partial circle and the back to create a batch flipping conveyance which has been sometimes referred to herein as a shuffle type feed. Thus, rotation herein includes rotation of only a partial circle and shuffle feed includes a batch flipping action by interspaced flippers.

This invention is not, however, to be construed as limited to the particular forms disclosed herein since these are to be regarded as illustrative rather than restrictive.

We claim:

1. A vegetable cutting apparatus having a shuffle feed mechanism comprising in combination:

a frame;

cutting means connected to said frame for cutting vegetables fed thereto;

feed means connected to said frame and adapted to feed vegetables to said cutting blades, said feed means having a plurality of first rotary members connected to said frame and having surfaces for receiving and then moving vegetables, each said first rotary member being rotatable on a shaft in one direction and then in a second direction; a plurality of second rotary members connected to said frame interspersed between said first rotary members and having surfaces for receiving and moving vegetables, each said second rotary member being rotatable on a shaft in one direction and then in a second direction;

drive means for moving said first and second rotary members in a timed sequence with each other;

first connection means for connecting said drive means to said first rotary members for rotating said rotary members in one direction and then in the opposite direction.

second connecting means for connecting said drive means to said second rotary members for rotating said rotary members in one direction and then in the opposite direction, whereby said first and second rotary means will shift material from one to the other toward said cutting means; and said drive means having at least one cam operatively coupled to a motor for driving at least one said connection means; and said first and second connecting means each having cam followers thereon for following a cam over a predetermined camming path; said first and second connection means each having reciprocating members operatively connected to one said cam follower for movement with said cam follower for actuation of said plurality of first and second rotary members by rotation of at least one cam actuating each said cam follower and said first and second connection means also having a plurality of connecting members, each said connecting member connecting one said rotary member shaft with one said reciprocating member whereby rotation of said first and second rotating members is cam controlled.

2. The apparatus in accordance with claim 1 in which said motor driven cam is engaged by cam followers on said first and second connection means for driving said first and second connection means in a timed sequence.

3. The apparatus according to claim 1 in which said reciprocating drive bar of said first connection means is located over the reciprocating drive bar of said second connection means.

4. The apparatus according to claim 3 in which said cam drives said first rotary members into a generally upright position when said second rotary members are in a generally horizontal position.

5. The apparatus in accordance with claim 4 in which each said cam follower is attached to an arm which is connected to a shaft rotatably held to said frame and said shaft is attached to an arm which drives one reciprocating drive bar.

6. The apparatus in accordance with claim 1 in which said cutting means includes a plurality of rotatable cutting discs adjustably mounted to said frame.

7. The apparatus in accordance with claim 6, in which a loading receptacle is attached to said frame for catching vegetables fed thereto and a collection receptacle is mounted on said frame below said cutting blades for receiving uniformly cut vegetables.

* * * * *